US011070683B2

(12) United States Patent
Hasebe

(10) Patent No.: US 11,070,683 B2
(45) Date of Patent: Jul. 20, 2021

(54) ROTATION DRIVE CONTROL APPARATUS, SHEET PROCESSING APPARATUS AND IMAGE FORMING APPARATUS

(71) Applicant: Tetsuya Hasebe, Yamanashi-ken (JP)

(72) Inventor: Tetsuya Hasebe, Yamanashi-ken (JP)

(73) Assignee: CANON FINETECH NISCA INC., Misato (JP)

(*) Notice: Subject to any disclaimer, the term of this patent is extended or adjusted under 35 U.S.C. 154(b) by 0 days.

(21) Appl. No.: 17/079,820

(22) Filed: Oct. 26, 2020

(65) Prior Publication Data
US 2021/0185178 A1 Jun. 17, 2021

(30) Foreign Application Priority Data

Dec. 13, 2019 (JP) .............................. JP2019-224989

(51) Int. Cl.
H04N 1/00 (2006.01)
G06K 15/00 (2006.01)

(52) U.S. Cl.
CPC ..... H04N 1/00037 (2013.01); H04N 1/00912 (2013.01)

(58) Field of Classification Search
CPC ................ H04N 1/00037; H04N 1/00912
See application file for complete search history.

(56) References Cited

U.S. PATENT DOCUMENTS

2010/0189487 A1* 7/2010 Iwata ................. G03G 15/6582
399/407
2014/0292847 A1* 10/2014 Aruga ..................... B41J 25/308
347/8
2015/0362879 A1* 12/2015 Kaneko .............. G03G 15/5058
399/49
2018/0162674 A1* 6/2018 Nakano .............. G03G 15/6547

FOREIGN PATENT DOCUMENTS

JP 2007-202259 A 8/2007
JP 2007-330040 A 12/2007

* cited by examiner

Primary Examiner — Juan M Guillermety
(74) Attorney, Agent, or Firm — Manabu Kanesaka

(57) ABSTRACT

A rotation drive control apparatus includes a first mode for counting a detection value of a second detecting member to control a shift amount of a rotation member, based on a detection value of a first detecting member obtained in controlling and rotating a motor, and a second mode for extracting at least one abnormal portion among the motor, control section, mechanism section, and detecting section, based on detection patterns of combinations of a state in which the first detecting member detects a rotation reference position within a predetermined time, or a state in which the first detecting member does not detect the rotation reference position within the predetermined time, and a state in which the second detecting member detects a rotation shift position within a predetermined time, or a state in which the second detecting member does not detect the rotation shift position within the predetermined time.

18 Claims, 18 Drawing Sheets

FIG. 16

| | DETECTION PATTERN | | | |
| --- | --- | --- | --- | --- |
| | PATTERN 1 | PATTERN 2 | PATTERN 3 | PATTERN 4 |
| ROTATION REFERENCE POSITION (P1a) | L→H | L→H | L (WITHOUT CHANGE) | L (WITHOUT CHANGE) |
| ROTATION SHIFT POSITION (P1b) | CHANGE | WITHOUT CHANGE | CHANGE | WITHOUT CHANGE |
| ABNORMAL ESTIMATED PORTION | | SECOND DETECTING MEMBER (15) | FIRST DETECTING MEMBER (14) MECHANISM SECTION (12) | MOTOR (60M) MECHANISM SECTION (12) CONTROL SECTION (11) |

FIG. 17

| | DETECTION PATTERN 2 (ROTATION DIRECTION 2) | | | |
|---|---|---|---|---|
| | WITHOUT ABNORMALITY | SECOND DETECTING MEMBER (15) | MECHANISM SECTION (12) | MECHANISM SECTION (12) CONTROL SECTION (11) |
| PATTERN 11 | | NOT SUBJECT OF DIAGNOSIS | NOT SUBJECT OF DIAGNOSIS | NOT SUBJECT OF DIAGNOSIS |
| PATTERN 12 | NOT SUBJECT OF DIAGNOSIS | | NOT SUBJECT OF DIAGNOSIS | NOT SUBJECT OF DIAGNOSIS |
| PATTERN 13 | MECHANISM SECTION (12) | MECHANISM SECTION (12) | FIRST DETECTING MEMBER (14) | NOT SUBJECT OF DIAGNOSIS |
| PATTERN 14 | MECHANISM SECTION (12) CONTROL SECTION (11) | NOT SUBJECT OF DIAGNOSIS | NOT SUBJECT OF DIAGNOSIS | MOTOR (60M) MECHANISM SECTION (12) CONTROL SECTION (11) |
| DETECTION PATTERN 1 (ROTATION DIRECTION 1) | | | | |

ROTATION DRIVE CONTROL APPARATUS, SHEET PROCESSING APPARATUS AND IMAGE FORMING APPARATUS

CROSS-REFERENCE TO RELATED APPLICATION

The present application is based on and claims priority of Japanese Patent Application No. 2019-224989 filed on Dec. 13, 2019, the disclosure of which is incorporated herein.

TECHNICAL FIELD

The present invention relates to a rotation drive control apparatus, sheet processing apparatus and image forming apparatus having functions of extracting and identifying an operation abnormal portion from a plurality of drive mechanisms and a control section for controlling the mechanism.

BACKGROUND ART

Conventionally, in various types of apparatuses comprised of a plurality of drive mechanisms and drive members, in the case where an operation abnormality occurs, it has been difficult to promptly identify the abnormal portion. Therefore, in various types of apparatuses, there are apparatuses provided with abnormality diagnosis functions such as a sensor and circuit to detect the operation abnormal portion inside or outside, aside from normal operation mechanisms.

For example, an image forming apparatus provided with a plurality of functions such as a copier and scanner is provided with a sheet processing apparatus for binding sheets with images formed and providing a punch hole in a predetermined portion, and the sheet processing apparatus is comprised of various drive mechanisms and drive members. Among the mechanisms and members, there is a punch unit for punching in a predetermined portion of a sheet. In the punch unit, by converting rotation motion of a motor into linear reciprocating motion, a punch member having a circular blade at its front end is passed through the predetermined portion of the sheet, and a punch hole is thereby provided. A mechanism of the unit it provided with a motor, a control section for driving the motor, a cam member rotating by the motor, and a punch member coupled to the cam member. The cam member rotates by undergoing forward-rotation motion and backward-rotation motion of the motor, thereby separates the punch blade from a sheet surface, and reciprocates to shift between a home position that is a reference for an operation start and a punch operation position for punching in the sheet. The cam member is provided with each of a home position detecting sensor for detecting the home position, and a phase detecting sensor to detect a position in punching, and rotation of the motor is controlled based on output values of these sensors.

In such an apparatus, when a shift is performed from the home position to the punch operation position, in the case of not detecting the home position that is a shift destination, even after a lapse of beforehand set predetermined time or more, control is performed to notify of an error. At this point, a maintenance person who maintains the punch unit makes repairs based on an error code notified by error notification. Thus, service support is operated to recover operation of the punch unit to a normal state.

In the case of repairing a sheet post-processing apparatus based on the error code, the maintenance person successively checks whether or not a failure occurs in component parts related to the error code in the field, and identifies the failure portion needing repairs. When identification of the failure portion is not performed promptly, significant time is required for repairs, and during the repairs, an inconvenience is imposed on users. Accordingly, in order to recover the apparatus quickly, techniques are important to identify the failure portion inside the apparatus in detail.

In Japanese Patent Application Publication No. 2007-202259 (Patent Document 1), in addition to a rotation state detecting means for detecting a rotation state of a motor, an abnormality detecting means is disclosed to detect an abnormality of a drive circuit for driving the motor, using an intermediate potential detecting means for detecting intermediate potential between each terminal potential of the motor and potential on the low potential side of a motor drive power supply.

Further, in Japanese Patent Application Publication No. 2007-330040 (Patent Document 2), a means for performing discrimination detection of a motor break is disclosed, using a configuration for detecting a terminal voltage of resistance through which the means is connected to a power supply.

DISCLOSURE OF INVENTION

Problems to be Solved by the Invention

In the case of operating the punch unit as described, used are a motor as a drive source and a drive circuit for driving the motor. In identifying an operation abnormal portion of the apparatus comprised of a DC motor as a representative example of the motor, and an H bridge circuit (or a driver IC with the H bridge circuit incorporated) as the circuit for driving the DC motor, Patent Document 1 requires the circuit for detecting a current, aside from the above-mentioned drive circuit, and complication is expected by upsizing of a circuit board and part addition.

Further, in the configuration of Patent Document 2, although the configuration addition is not large, the detection permits only a break, and since it is difficult to identify a detailed portion for generating an error factor, and there is a problem that it takes a time to repair the abnormality.

Therefore, in the present invention, in order to solve the above-mentioned problems, in a configuration including a plurality of drive mechanisms and control section, it is an object to provide a rotation drive control apparatus, sheet processing apparatus and image forming apparatus provided with a section capable of extracting and identifying a portion where an operation abnormality occurs, based on combination patters of detection obtained at the time the abnormality occurs from a detecting member for performing control of normal operation.

Means for Solving the Problem

In order to attain the above-mentioned object, a rotation drive control apparatus of the present invention is provided with a motor, a control section including a control member for driving and controlling the motor, a mechanism section including a rotation member that undergoes drive of the motor to rotate, and a detecting section including a first detecting member that detects a rotation reference position of the rotation member, and a second detecting member that detects a rotation shift position of the rotation member, and the control member is provided with a first mode for counting a detection value of the second detecting member to control a shift amount of the rotation member, based on a detection value of the first detecting member obtained in controlling and rotating the motor, and a second mode for extracting at least one abnormal portion from among the motor, control section, mechanism section, and detecting section, based on detection patterns comprised of combinations of a state in which the first detecting member detects the rotation reference position within a predetermined time, or a state in which the first detecting member does not detect the rotation reference position within the predetermined time, and a state in which the second detecting member detects the rotation shift position within a predetermined time, or a state in which the second detecting member does not detect the rotation shift position within the predetermined time, obtained in controlling and rotating the motor.

Advantageous Effect of the Invention

According to the rotation drive control apparatus of the present invention, in addition to the first mode to perform normal drive control, the apparatus includes the function of extracting an abnormal portion in the case where the abnormality occurs in drive and control in the first mode, and therefore, is capable of performing support to check and recover the abnormal portion promptly and properly. Further, since the configuration for actualizing the second mode is common to the configuration of the first mode, it is possible to avoid increases in the number of parts and cost.

BRIEF DESCRIPTION OF DRAWINGS

FIG. 16 is an abnormality extraction table based on a combination of detection patterns; and FIG. 17 is an abnormality identification table based on combinations of detection patterns.

BEST MODE FOR CARRYING OUT THE INVENTION

Figure 1:
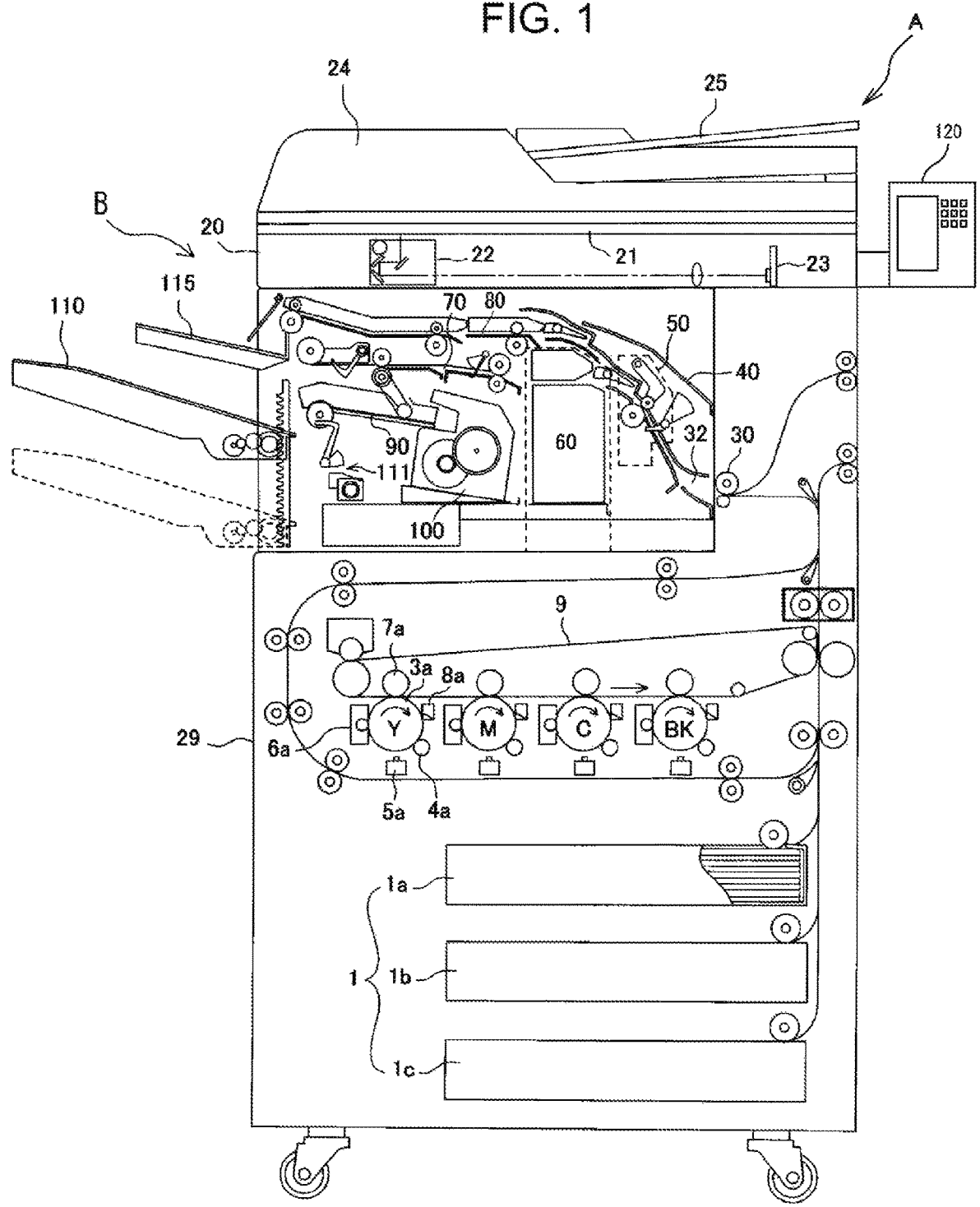
FIG. 1 is a cross-sectional view of a sheet processing apparatus provided with a rotation drive control apparatus of the present invention and an image forming apparatus provided with the sheet processing apparatus.
Figure 2:
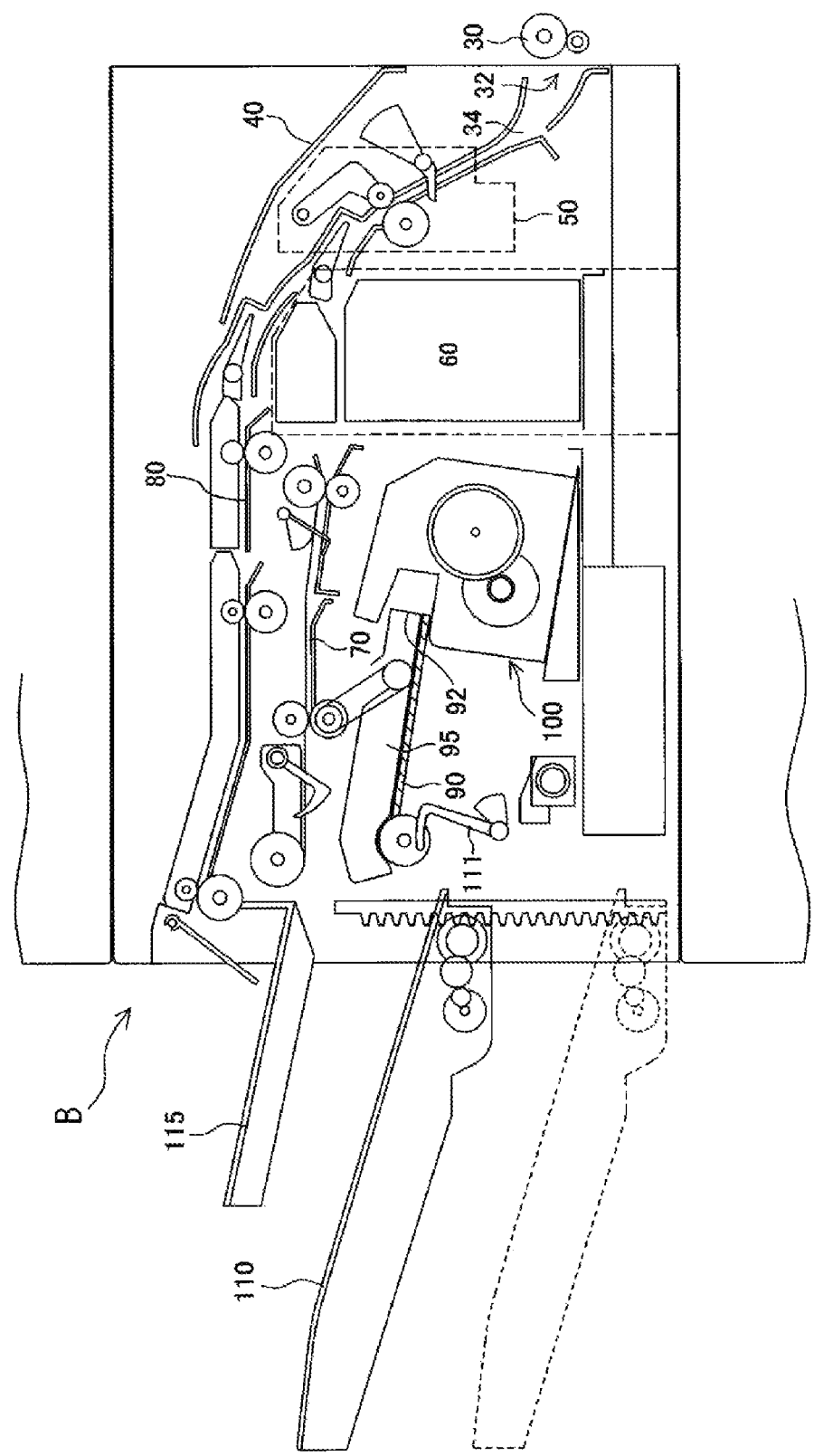
FIG. 2 is a cross-section view of the sheet processing apparatus.

A rotation drive control apparatus according to the present invention, and a sheet processing apparatus and image forming apparatus using the rotation drive control apparatus will be described below with reference to drawings. FIG. 1 is a cross-sectional view illustrating an entire configuration of an image forming apparatus A mounted with a sheet processing apparatus B, and FIG. 2 is a cross-section view of the sheet processing apparatus B.

As shown in FIG. 1, the image forming apparatus A uses an electrophotographic scheme, and in the apparatus are disposed a paper feed section 1 comprised of three-stage paper feed cassettes 1a, 1b, and 1c for storing sheets below an image forming section 2, and an image reading apparatus 20. When the sheet processing apparatus B is not mounted, sheet discharge space is provided above the image forming section 2, and the apparatus 20 is disposed above the space. Accordingly, in the case where the sheet processing apparatus B is disposed, as shown in the figure, the apparatus B is disposed on an apparatus frame 29 as the so-called in-body type using the above-mentioned sheet discharge space.

The image forming section 2 has a photosensitive drum 3a comprised of four color components (yellow Y, magenta M, cyan C, black BK), a charge apparatus 4a comprised of a charge roller for charging the photosensitive drum 3a, and an exposure apparatus 5a that makes a latent image from an image signal read by the image reading apparatus 20. Further, the section 2 is provided with a developing apparatus 6a that forms a toner image from the latent image formed on the photosensitive drum 3a, and a first transfer roller 7a that first transfers the image on the photosensitive drum 3a formed by the developing apparatus 6a to an intermediate transfer belt 9. This configuration performs first transfer to the intermediate transfer belt 9 for each color. A color component left on the photosensitive drum 3a is retrieved by a photosensitive cleaner 8a to prepare for next image formation.

In the image reading apparatus 20, an original document placed on a document stacker 25 is fed to platen 21 by a document feeding apparatus 24, the fed original document is irradiated by a scan unit 22, and is thereby sequentially read by a photoelectric conversion element (e.g., CCD), and an image is stored in a data storage section not shown.

In the sheet processing apparatus B shown in FIG. 2 are disposed a transport unit 40 provided with a shift roller unit 50 for receiving a sheet discharged from a main-body discharge roller 30, from a carry-in opening 32, a punch unit 60 for punching a punch hole in the sheet, and a binding unit 100 for temporarily placing the sheet on a processing tray 90 to perform binding processing. In the subsequent description in this Embodiment, unless otherwise specified, it is assumed that a sheet transport direction is a direction in which the sheet is received in the transport unit 40 from the main-body discharge roller 30 and is transported to the direction of the processing tray 90.

Further, the sheet processing apparatus B is provided with a first transport path 70 for guiding to the processing tray 90 side, and a branched second transport path 80, downstream of the shift roller unit 50 in the sheet transport direction from a carry-in path 34 for guiding the sheet from the carry-in opening 32. A first collection tray 110 is provided to store the sheet discharged from the processing tray 90 or the sheet directly discharged from the first transport path 70, downstream of the first transport path 70 in the sheet transport direction, and above the tray 110, a second collection tray 115 for storing sheets fed from the second transport path 80 as required is disposed to overlap.

As shown in FIG. 2, the first collection tray 110 is provided with a paper surface sensor 111S for detecting a paper surface by a collection tray sensor 111 contacting a top surface of the sheet stored in the tray 110. An up-and-down motor 110M is driven corresponding to a paper surface level of the paper surface sensor 111S to always keep a storage position within a certain range.

In addition, the punch unit 60 is disposed which punches a punch hole near an edge portion (front/rear end edge in the sheet transport direction) of the sheet and constitutes the sheet processing apparatus B, and in the case of not particularly needing a punch hole in a sheet, functions as a transport guide unit for simply guiding the sheet.

Next, the punch unit 60 will be described using a front view of FIG. 3 and cross-sectional view of FIG. 4. The punch unit 60 is comprised of a punch shift unit 61 provided with punch blades 62 and die holes 63, and a fix portion 69 provided with a dust box 67 and the like. The punch blade 62 is configured to reciprocate and shift in the vertical direction as shown in FIG. 4 with respect to the die hole 63, by rotation of a rotation member (punch cam) 64. The punch cam 64 is provided with two-hole cams 64WC to punch two punch holes on opposite sides with a center of the sheet positioned therebetween in a width direction of the sheet crossing the sheet transport direction, and three-hole cams 64TC to punch on the opposite sides, while punching in the center of the sheet.

In the punch shift unit 61, in order to be able to shift in the width direction of the sheet crossing the sheet transport direction, rotation of a shift motor 61M provided in the fix portion 69 including the dust box 67 is engaged in a shift rack 66 fixed to the punch shift unit 61 via a shift gear 61G. Accordingly, according to forward-backward rotation drive of the shift motor 61M, the punch shift unit 61 shifts in the right-left direction of the arrow shown in FIG. 3. In order to perform this shift smoothly, shift rollers 61R are provided between the punch shift unit 61 and the fix portion 69. For punch holes, as described above, a two-hole punch blade 62WP is provided in two portions, a three-hole punch blade 62TP is provided in three portions, and the blade 62WP and blade 62TP correspond to a two-hole die hole 63WD and three-hole die hole 63TD, respectively.

Figure 3:
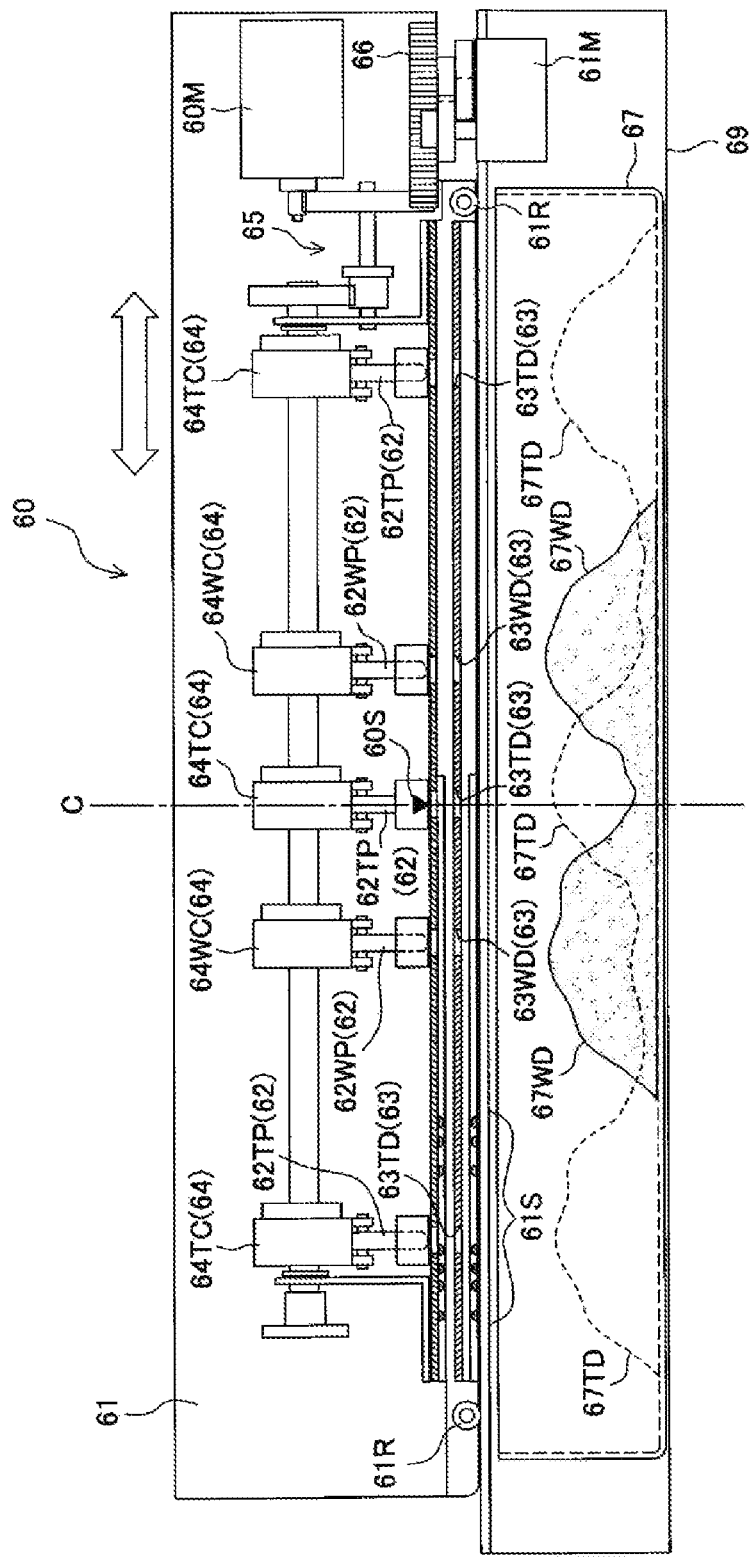
FIG. 3 is a front schematic view of a punch unit provided with the rotation drive control apparatus.
Figure 4:
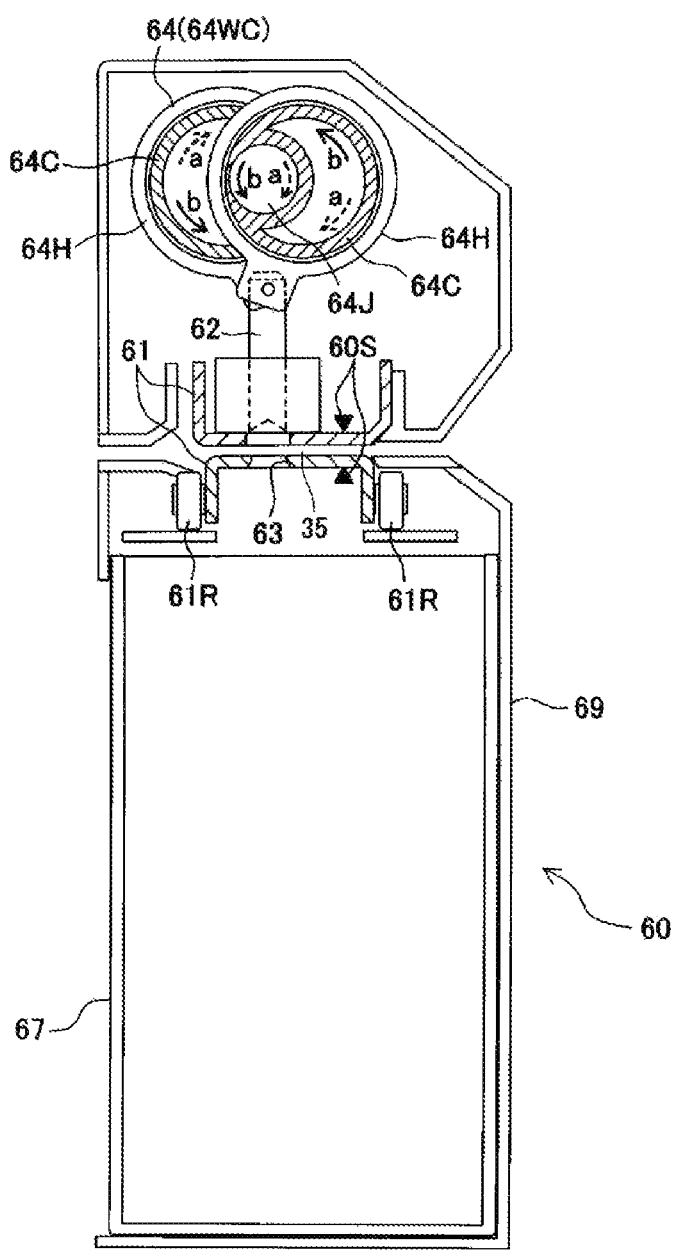
FIG. 4 is a side schematic view of the punch unit.

As shown in FIGS. 3 and 4, the two-hole cam 64WC and the three-hole cam 64TC are provided so that the phase is different therebetween. The punch cam 64 is driven by a DC motor (motor) 60M with a brush via a punch gear 65, rotates an eccentric cam 64C that rotates by a cam drive shaft 64J, by switching between rotation of the arrow a direction and the b rotation direction of the motor 60M, and shifts a cam holder 64H coupled to the punch blade 62 provided on the outer side thereof. At this point, since the phases of the cams are different, it is possible to switch between the two-hole punch blade 62WP and the three-hole punch blade 62TP.

As shown in FIG. 3, on the side opposite to the motor 60M of the punch shift unit 61, side edge sensors 61S are provided with a sheet path therebetween, corresponding to sheet sizes. The side edge sensor 61S is to detect an edge portion of the sheet in the width direction in a position near the rear end of the sheet in the transport direction. The punch shift unit 61 is shifted slightly from the outer side to the inner side of the edge portion in the width direction of the sheet, and the sheet edge portion is detected by a state change (rising or falling) of the sensor to determine punch positions of two holes or three holes. Further, in a position that corresponds to the center (center of three-hole punch blades 62TP) in the width direction of the sheet, a punch sensor 60S is provided to detect an end portion of the sheet in the transport direction. It is determined that a position in which the rear end of the sheet in the transport direction passes through the punch sensor 60S is a punch position of the sheet. As a matter of course, a position obtained by predetermined counts from the punch sensor 60S may be the punch position.

Figure 5:
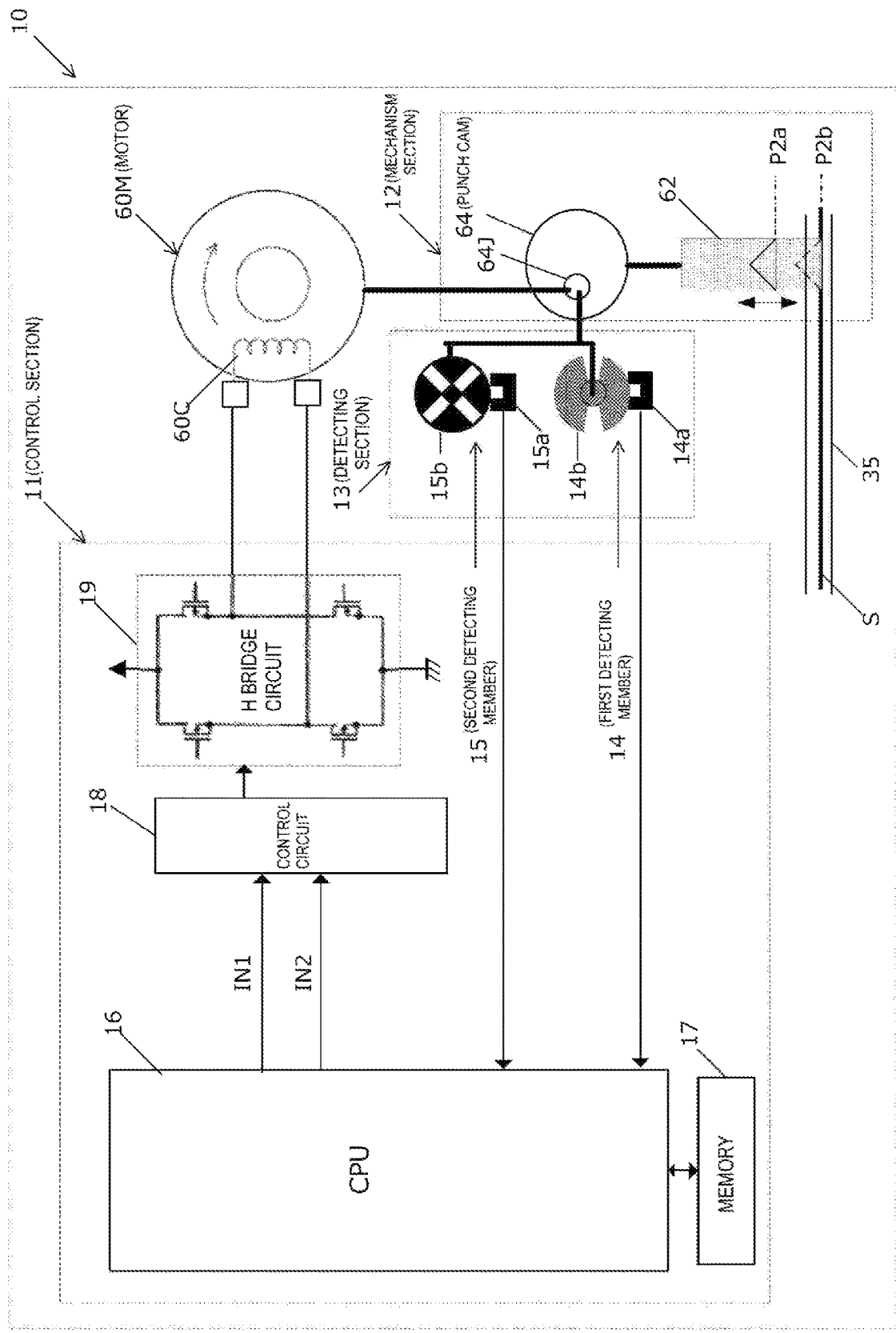
FIG. 5 is a block diagram illustrating a configuration of the rotation drive control apparatus.

FIG. 5 illustrates a system configuration of a rotation drive control apparatus 10 installed in the punch unit 60. The rotation drive control apparatus 10 is comprised of the motor 60M, a control section 11 having a control member for driving and controlling the motor 60M, a mechanism section 12 having punch cams 64 that rotate by undergoing drive of the motor 60M, and the punch blade 62 in conjunction with the punch cam 64, and a detecting section 13 having a first detecting member 14 that detects a rotation reference position P1$a$ of the punch cam 64 and a second detecting member 15 that detects a rotation shift position P1$b$ of the punch cam 64.

The control section 11 has a CPU 16, memory 17, control circuit 18, H bridge circuit 19 and control member to control these parts, and by the control member, the rotation of the motor 60M is controlled. The control member of the present invention is provided with a first mode to perform normal punch operation by counting a detection value of the second detecting member 15 to control a shift amount of the punch cam 64, based on a detection value of the first detecting member 14 obtained in controlling and rotating the motor 60M, and a second mode to extract at least one abnormal portion from among the motor 60M, control section 11, mechanism section 12, first detecting member and second detecting member 15, based on detection patterns comprised of combinations of a state in which the first detecting member 14 detects the rotation reference position P1$a$ within a predetermined time, or a state in which the first detecting member 14 does not detect the rotation reference position within the predetermined time, and a state in which the second detecting member 15 detects the rotation shift position P1$b$ within a predetermined time, or a state in which the second detecting member 15 does not detect the rotation shift position within the predetermined time, obtained in controlling and rotating the motor 60M.

Figure 6:
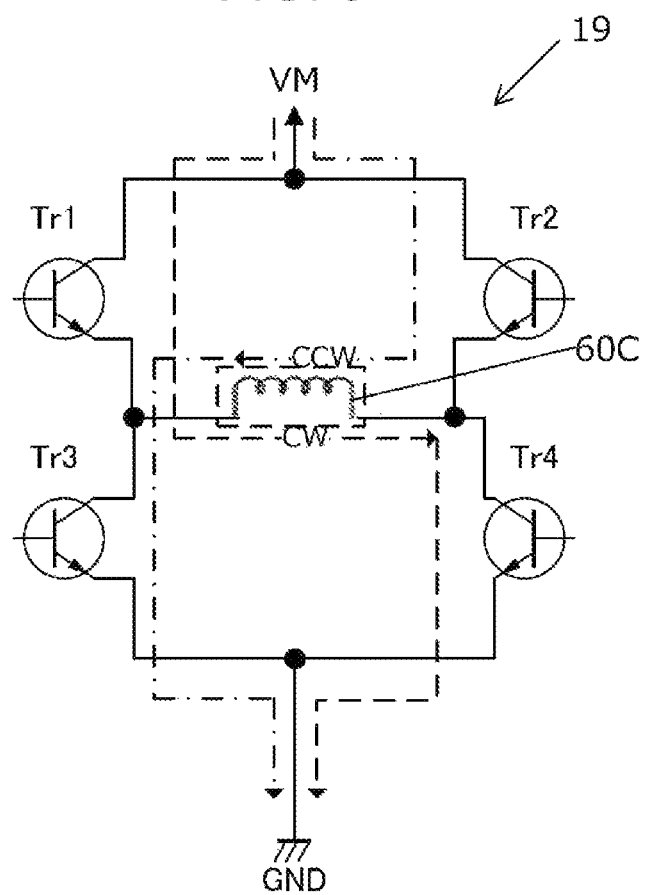
FIG. 6 illustrates an H bridge circuit diagram.

FIG. 6 illustrates a configuration of the H bridge circuit 19. The H bridge circuit 19 is comprised of four switches (transistors) Tr, and Tr1, Tr2, Tr3 and Tr4 are connected to opposite terminals of a coil 60C of the motor 60M. Then, the CPU 16 inputs, to the control circuit 18, a control signal IN1 (H: ON/L: OFF) to control ON/OFF of the motor 60M, and a control signal IN2 (H: forward rotation (CW)/L: backward rotation (CCW)) to control the rotation direction of the motor 60M, and the rotation of the motor 60M is thereby controlled.

FIGS. 7A to 7F illustrate detection operation in the detecting section 13. The detecting section 13 is provided with the first detecting member 14 and second detecting member 15, and is disposed with the drive shaft 64J of the punch cam 64 being the center. The first and second detecting members 14, 15 are provided with first and second detection-object members 14$b$, 15$b$ in the shape of a circular plate that rotates together with the drive shaft 64J, and first and second photosensors 14$a$, 15$b$ such as photo-interrupters.

The first detection-object member 14$b$ is disposed with the drive shaft 64J being the center, the second detection-object member 15$b$ is disposed on the outer side of the first detection-object member 14b, and respective detection-object members rotate integrally with the drive shaft 64j as the center. The first detection-object member 14b is provided with first slits 14c which light transmits in a direction opposed 180° with the drive shaft 64J therebetween. The first slit 14c is a flag to detect the rotation reference position P1a of the punch cam 64. Further, the second detection-object member 15b is provided with a plurality of second slits 15c which light transmits along the rotation direction with the drive shaft 64J as the center. The second slit 15c is a flag to detect the rotation shift position P1b of the punch cam 64.

The first photosensor 14a detects shade (H) and transmittance (L) in each edge of the first slit 14c, and thereby detects the rotation reference position P1a of the punch cam 64. On the other hand, the second photosensor 15a detects shade (H) and transmittance (L) in each edge of the second slit 15c, and thereby detects the rotation shift position P1b of the punch cam 64. The second photosensor 15a follows a plurality of second slits 15c, and detects the rotation shift position P1b of the punch cam 64. In the second detection-object member 15b shown in this Embodiment, the second slit 15c is provided in 40 portions, and it is thereby possible to use edges in 80 portions as a change in detection of the photosensor 15a. Detection resolution of the second photosensor 15a in the second mode described later needs to be a half or less of detection resolution of the first photosensor 14a. In order to actualize the detection resolution, it is essential only that the second slit 15c is provided every 90° with respect to a pair of first slits 14c provided in the first detection-object member 14b, and the slits in 40 portions in this Embodiment have sufficient resolution. In addition, in this Embodiment, the photosensor is used as a noncontact sensor, and may be an inductive proximity sensor, and the type of sensor is not particularly limited.

Figure 7A:
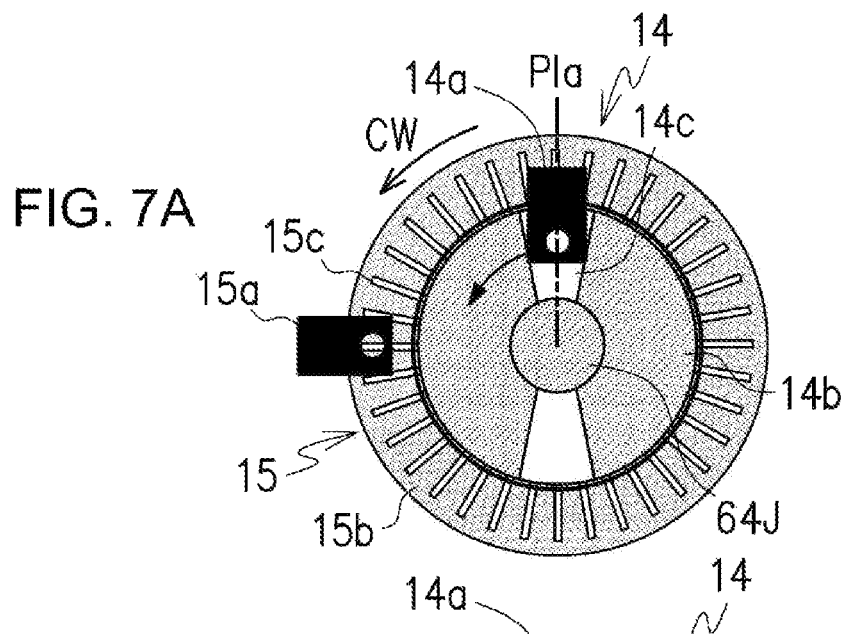
FIGS. 7A to 7C contain explanatory views illustrating detection positions in one rotation direction of first and second detecting members.

Next, a series of punch operation (first mode) in the punch unit 60 will be described with reference to FIGS. 5, 7A-7F and 8. First, in the first detecting member 14, one rotation reference position P1a of the punch cam 64 is detected via the first photosensor 14a and first slit 14c (FIG. 7A). At the initial time of detection, in the case where the first photosensor 14a and first slit 14c are in an overlapping position, light of the first photosensor 14a is in a transmittance state. In the case of this transmittance state, the punch cam 64 is in the punch reference position Pia, and as shown in FIG. 5, in the punch blade 62, its front end is in a punch retract position P2a retracted a predetermined amount above from the transport path 35 of a sheet S. In this state, the motor 60M is rotated in one of rotation direction 1 (CW) and rotation direction 2 (CCW), and when any edge of the first slit 14c is detected, the motor 60M is halted. Further, the motor 60M is rotated CW or CCW that is immediate rotation, and when an edge is detected where a shade portion (portion except the first slit 14c) of the first detection-object member 14b is switched to the first slit 14c, is halted again. At the initial time of detection, in the case where the first photosensor 14a and the shade portion of the first detection-object member 14b are in an overlapping position, the motor 60M is rotated in the CW or CCW direction, and when any edge where the shade portion is switched to the first slit 14c is detected, is halted again. In each of the cases, while the first photosensor 14a is in the position in the state where light is transmitted, operation of the motor 60M is caused to wait. Subsequently, when the punch sensor 60s (see FIG. 4) detects the end portion of the rear end of the transported sheet in the sheet transport direction, the sheet is halted in the punch position.

Figure 7B:
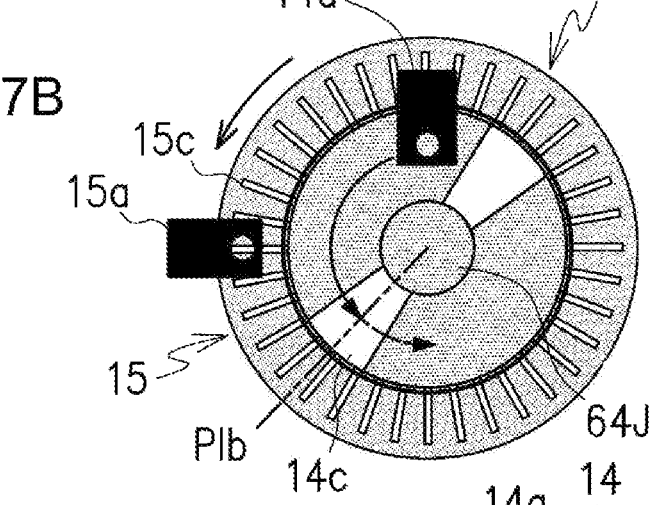
Figure 7C:
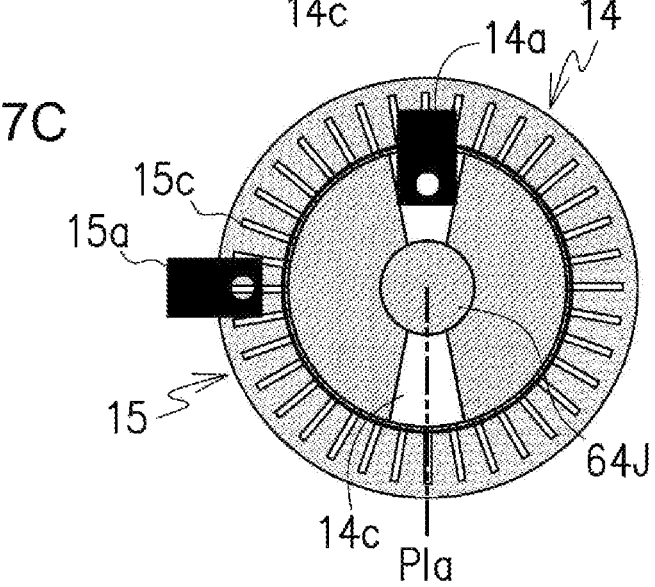

Then, after halting the sheet in the punch position, Tr1 and Tr4 of the H bridge circuit 19 shown in FIG. 6 are turned to ON to rotate the motor 60M in the CW direction. Then, after detecting the predetermined number of pulses in the second detecting member 15, by turning Tr1 to OFF and Tr3 to ON, the operation is shifted to brake operation. The rotation shift position P1b shown in FIG. 7B is a start position of the brake operation. At this point, as shown in FIG. 5, the punch blade 62 shifts to a punch operation position P2b for punching in the sheet S. Then, after the brake operation, the motor 60M performs overrun by a predetermined amount, and the punch cam 64 is thereby halted in the other rotation reference position P1a on the opposite side by 180° (FIG. 7C). Specifically, when the motor 60M is rotated and the first photosensor 14a detects the edge where the first slit 14c is switched to the shape portion, the second detecting member 15 starts to count pulses. At the time of rotating 100° from the position where the first photosensor 14a detects the edge (FIG. 7B), by turning Tr1 to OFF and Tr3 to ON, the brake operation is started. After the brake operation, due to inertia of the punch unit 60, overrun of 65° is performed, and the cam is halted in the other rotation reference position P1a on the opposite side (FIG. 7C). Also on the other rotation reference position P1a, while the first photosensor 14a is in the position in the state where light is transmitted, operation of the motor 60M is caused to wait.

Figure 7D:
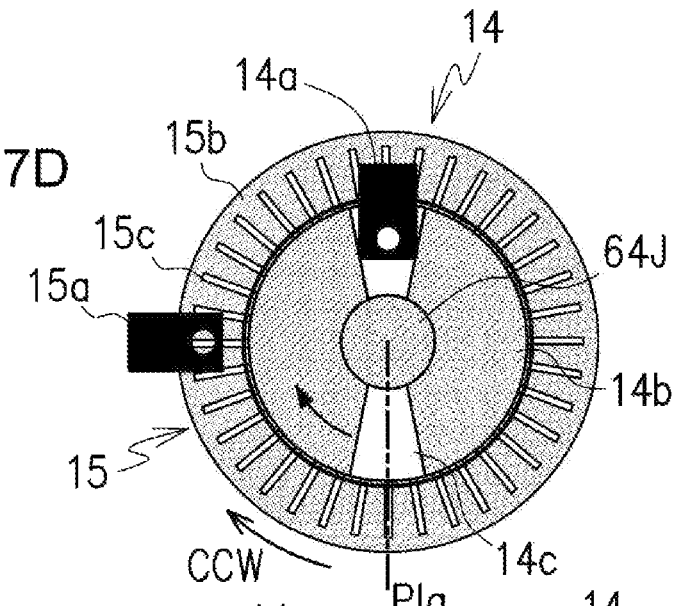
FIGS. 7D to 7F contain explanatory views illustrating detection positions in the other rotation direction of first and second detecting members.
Figure 7E:
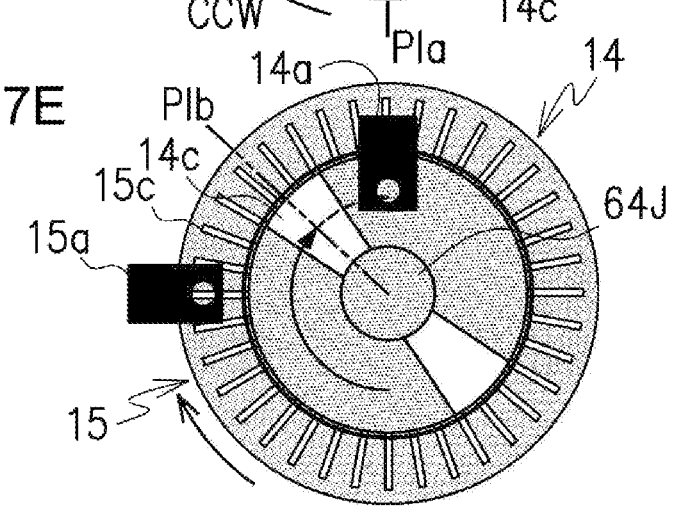
Figure 7F:
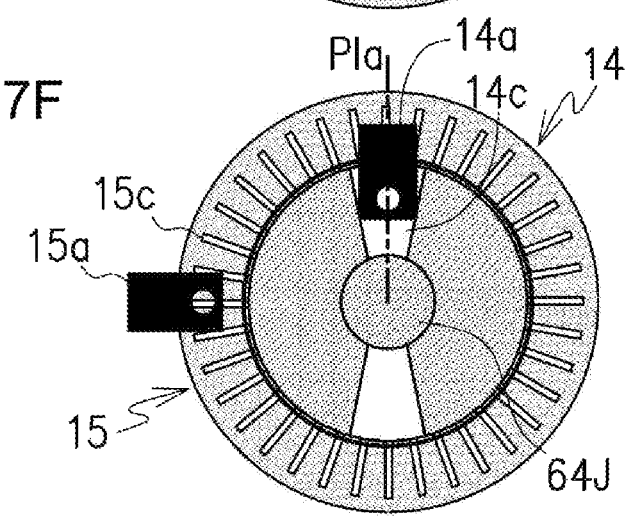
Figure 8:
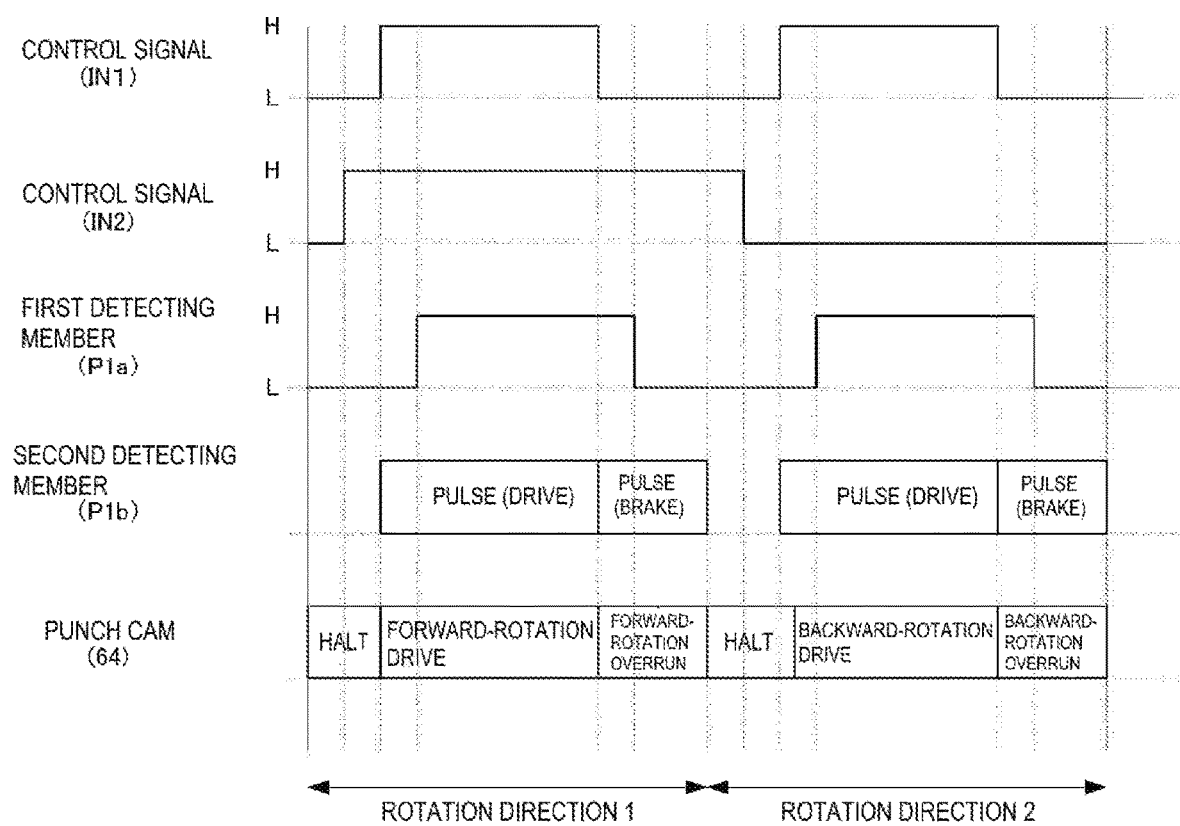
FIG. 8 is an operation timing chart in a first mode.

After finishing the above-mentioned punch operation, the prior sheet subjected to punching is discharged to the downstream side in the sheet transport direction, and the next sheet is guided to the punch position and is halted. Then, Tr2 and Tr3 of the H bridge circuit 19 are turned to ON to rotate the motor 60M in the CCW direction (FIG. 7D). Then, after detecting the predetermined pulse in the second detecting member 15, by turning Tr2 to OFF and Tr3 to ON, when the rotation shift position P1b is in the position of FIG. 7E, the operation is shifted to brake operation. After the brake operation, the motor 60M performs overrun by a predetermined amount, and the punch cam 64 is thereby halted in the other rotation reference position P1a on the opposite side by 180° (FIG. 7F). As described previously, since the two-hole cam 64WC and the three-hole cam 64TC are provided so that the phase is different therebetween with respect to the punch cam 64, in the case of forming punch holes in two portions of the sheet, the motor 60M is controlled to repeat rotation CW and CCW alternately.

The second mode in the above-mentioned control member will be described next. As described previously, the second mode is to extract at least one abnormal portion from among the motor 60M, control section 11, mechanism section 12, and detecting section 13 (first detecting member 14 and second detecting member 15), based on detection patterns comprised of combinations of a state in which the first detecting member 14 detects the rotation reference position P1a within a predetermined time, or a state in which the first detecting member 14 does not detect the rotation reference position within the predetermined time, and a state in which the second detecting member 15 detects the rotation shift position P1b within a predetermined time, or a state in which the second detecting member 15 does not detect the rotation shift position within the predetermined time, obtained in controlling and rotating the motor 60M.

Figure 9:
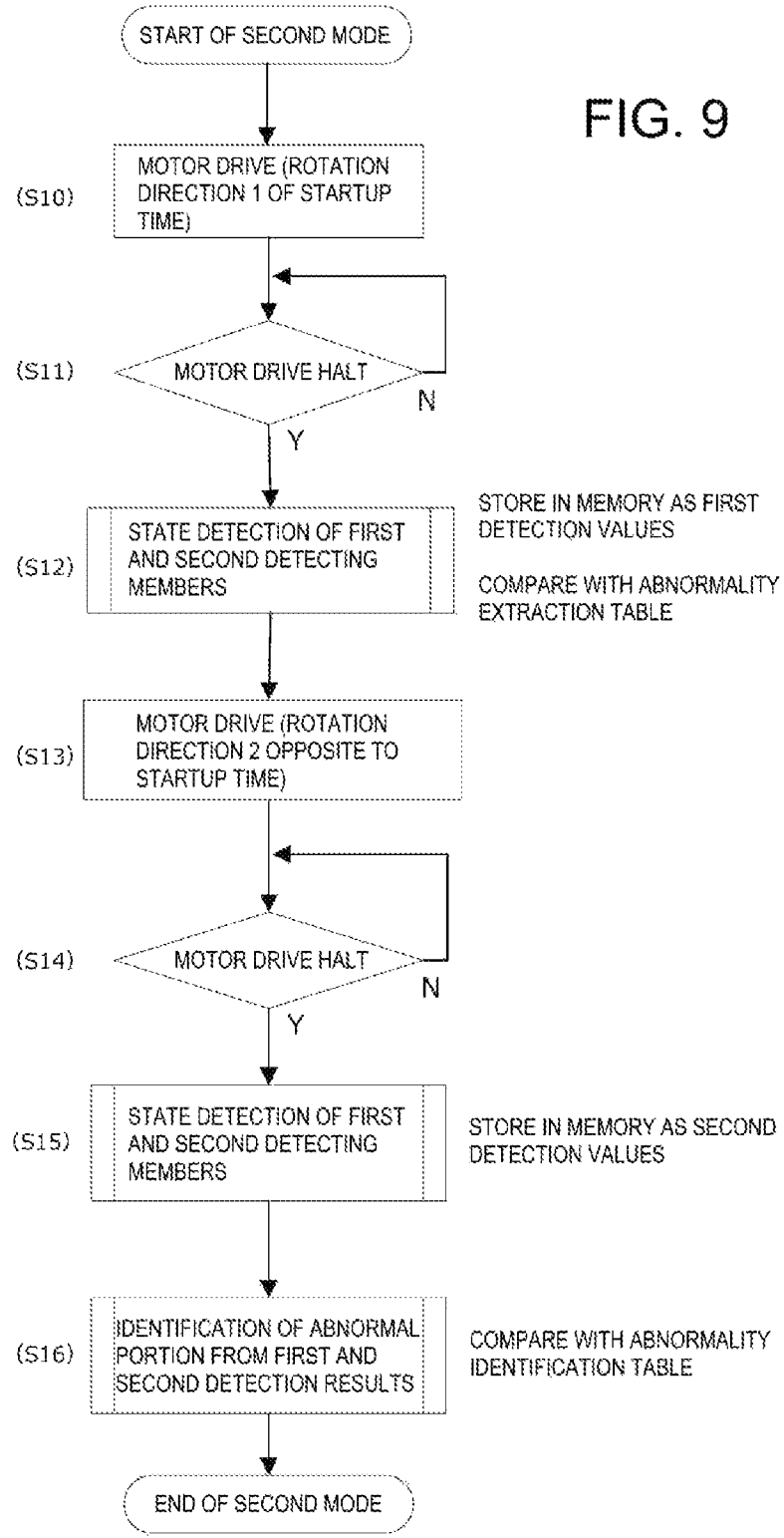
FIG. 9 is an entire flow diagram of a second mode.

FIG. 9 shows the entire flow in the second mode. The second mode is started in the case where the motor 60M is driven and normal punch operation is not started within a beforehand set predetermined time. When the second mode is started, the motor 60M is driven to rotate in the same direction as the rotation direction (rotation direction 1) at the initial startup time (S10). Then, when it is confirmed that the motor 60M is halted (S11), the rotation reference position P1a and rotation shift position P1b of the punch cam 64 at this point are detected by the first and second detecting members 14, 15 (S12). Data obtained by this detection is stored in the memory 17 as a first detection value. The memory 17 beforehand stores an abnormality extraction table based on combination patterns of detection values of the first and second detecting members 14, 15 as shown in FIG. 16. By comparing detection results (first detection value) from the first and second detecting members 14, 15 obtained in driving and rotating the motor 60M in the direction of rotation direction 1 with the abnormality extraction table shown in FIG. 16, it is possible to extract a portion where it is estimated that the abnormality occurs.

Next, the motor 60M is driven to rotate in the rotation direction 2 opposite to the above-mentioned rotation direction 1 (S13). Then, when it is confirmed that the motor 60M is halted (S14), the rotation reference position P1a and rotation shift position P1b of the punch cam 64 at this point are detected by the first and second detecting members 14, 15 (S15). Data obtained by this detection is stored in the memory 17 as a second detection value. As described previously, the memory 17 beforehand stores the abnormality extraction table based on combination patterns of detection values of the first and second detecting members 14, 15 as shown in FIG. 16. By comparing detection results (second detection value) from the first and second detecting members 14, 15 obtained in driving and rotating the motor 60M in the direction of rotation direction 2 with the abnormality extraction table shown in FIG. 16, it is possible to extract a portion where it is estimated that the abnormality occurs.

Further, the memory 17 beforehand stores an abnormality identification table for identifying an abnormal portion from among the motor 60M, control section 11, mechanism section 12 and detecting section 13, based on first and second detection values stored in the memory 17 as shown in FIG. 17. By comparing the first and second detection values obtained in driving and rotating the motor 60M in the rotation direction 1 and rotation direction 2 with the abnormality identification table, it is possible to identify a portion where the abnormality occurs from among the motor 60M, control section 11, mechanism section 12 and detecting section 13 (S16). Although it is possible to extract a portion with a possibility that an abnormality occurs, by comparing detection values of the first and second detecting members 14, 15 obtained in rotating the motor 60M in one direction with the abnormality extraction table, it is possible to identify an abnormal portion with more accuracy, by comparing combinations of detection values of the first and second detecting members 14, 15 obtained in rotating the motor 60M in mutually different directions with the abnormality identification table. In addition, in the case where it is not possible to identify any abnormal portion from the above-mentioned combinations of detection values, the case is not a subject of abnormality diagnosis.

In the case of using the DC motor (motor) 60M as a drive source for driving the mechanism section 12, and configuring the H bridge circuit 19 using the transistor and FET as a drive circuit for driving the motor 60M, by passing a current to the coil 60C of the motor 60M in both directions, rotation operation of CW (rotation direction 1) and CCW (rotation direction 2) is performed. In this case, since states are different in the transistors Tr1 to Tr4 in the H bridge circuit 19 which are turned to ON/OFF to switch the rotation direction of the motor 60M, it is not possible to properly identify an abnormality of the control section 11 including the H bridge circuit 19, only by the detection results from the first and second detecting members 14, 15 obtained in only one-direction rotation. For example, as pattern 3 shown in FIG. 16, from the rotation result of one direction, a plurality of sections, the detecting section 13 and mechanism section 12, is extracted as the portion where it is estimated that the abnormality occurs. In contrast thereto, by comparing between the detection results of both the rotation direction 1 and the rotation direction 2, as an example of pattern 23 shown in FIG. 17, it is made possible to identify the mechanism section 12 and the detecting section 13 separately as the abnormal portion.

In the foregoing, it is described that the second mode is started in the case where the motor 60M is driven by the first mode, and normal punch operation is not started within a beforehand set predetermined time, i.e. in the case where some operation abnormality occurs, and since the second mode also operates parallel concurrently with normal control in the first mode, it is also possible to identify an abnormal portion, at the same time as the time the normal punch operation is not started within the predetermined time and the occurrence of abnormality is detected.

Figure 10:
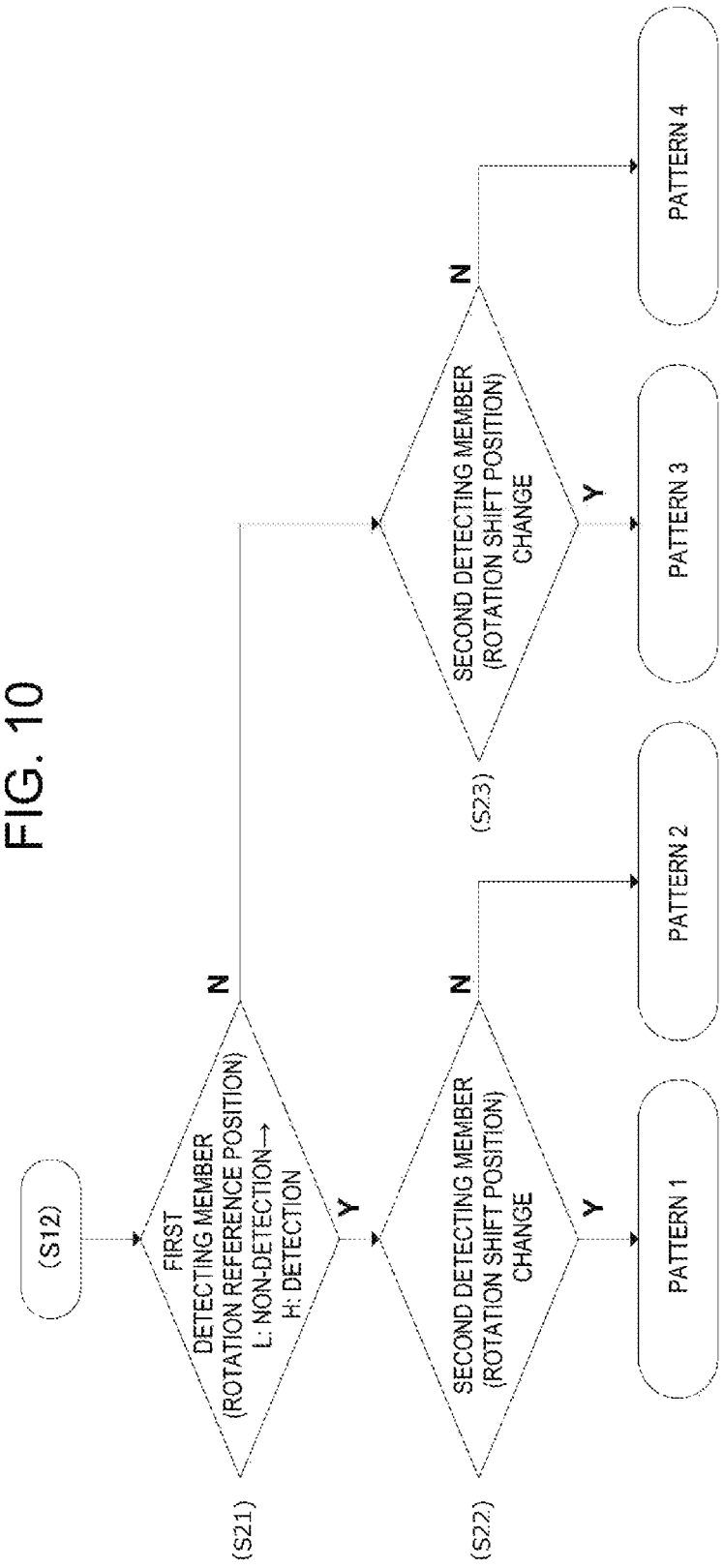
FIG. 10 is an extraction flow diagram for an abnormal portion.

FIG. 10 shows a detailed flow of the step (S12) in FIG. 9. Herein, it is checked whether or not a detection value in the first detecting member 14 changes L-*H within a predetermined time, and whether or not a detection value in the second detecting member changes within a predetermined time. In the detailed flow of FIG. 10, in order to make a branch to each pattern easy to see, it is expressed that the flow proceeds to step S22 or step S23 after determination in step S21, and actual monitoring and determination of detection is performed in the first detecting member 14 and second detecting member 15 individually. In the first mode described previously, detection pulses of the second detecting member 15 are counted with reference to detection of the first detecting member 14. In other words, the detection value from the second detecting member 15 is not used until detection in the detecting member 14. In contrast thereto, in the second mode, the detection values of the first detecting member 14 and second detecting member 15 are stored in the memory individually, and are compared with the beforehand stored abnormality extraction table. By this means, it is possible to individually judge the first detecting member 14 and second detecting member 15. In the case where the first detecting member 14 is detected within the predetermined time and the detection value of the second detecting member 15 changes within the predetermined time, the case is pattern 1, and it is determined that any abnormality does not exist among the first and second detecting members 14, 15, motor 60M, control section 11, and mechanism section 12. On the other hand, in the case where the first detecting member 14 is detected within the predetermined time and the detection value of the second detecting member 15 does not change within the predetermined time, the case is pattern 2, and it is determined that the abnormality exists in the second detecting member 15 (see FIG. 16).

In the case where the detection value in the first detecting member 14 is not detected within the predetermined time and the detection value in the second detecting member 15 changes within the predetermined time, the case is pattern 3, and it is determined that the abnormality exists in the first detecting member 14, and mechanism section 12. On the other hand, in the case where the detection value in the first detecting member 14 is not detected within the predetermined time and the detection value in the second detecting member 15 does not change within the predetermined time, the case is pattern 4, and it is determined that the abnormality exists in one of the motor 60M, control section 11 and mechanism section 12 (see FIG. 16). The above-mentioned predetermined time corresponds to a time required to rotate the punch cam 64 180°, because the first slits 14*c* are provided in the direction opposed 180° thereto with the drive shaft 64J of the punch cam 64 therebetween. In the second detecting member 15 having higher detection resolution (two times or more) than the first detecting member 14, the predetermined time required for detection may be set at ½ or less the time of the first detecting member 14, and since it is necessary to wait the detection value of the first detecting member 14, may be set at the same time as the time of the first detecting member 14.

FIGS. 11 to 15 show detailed flows of the step (S16) in FIG. 9. In the following description, it is assumed that detection patterns in the rotation direction 1 are patterns 11 to 14, and that detection patterns in the rotation direction 2 are patterns 21 to 24.

Figure 11:
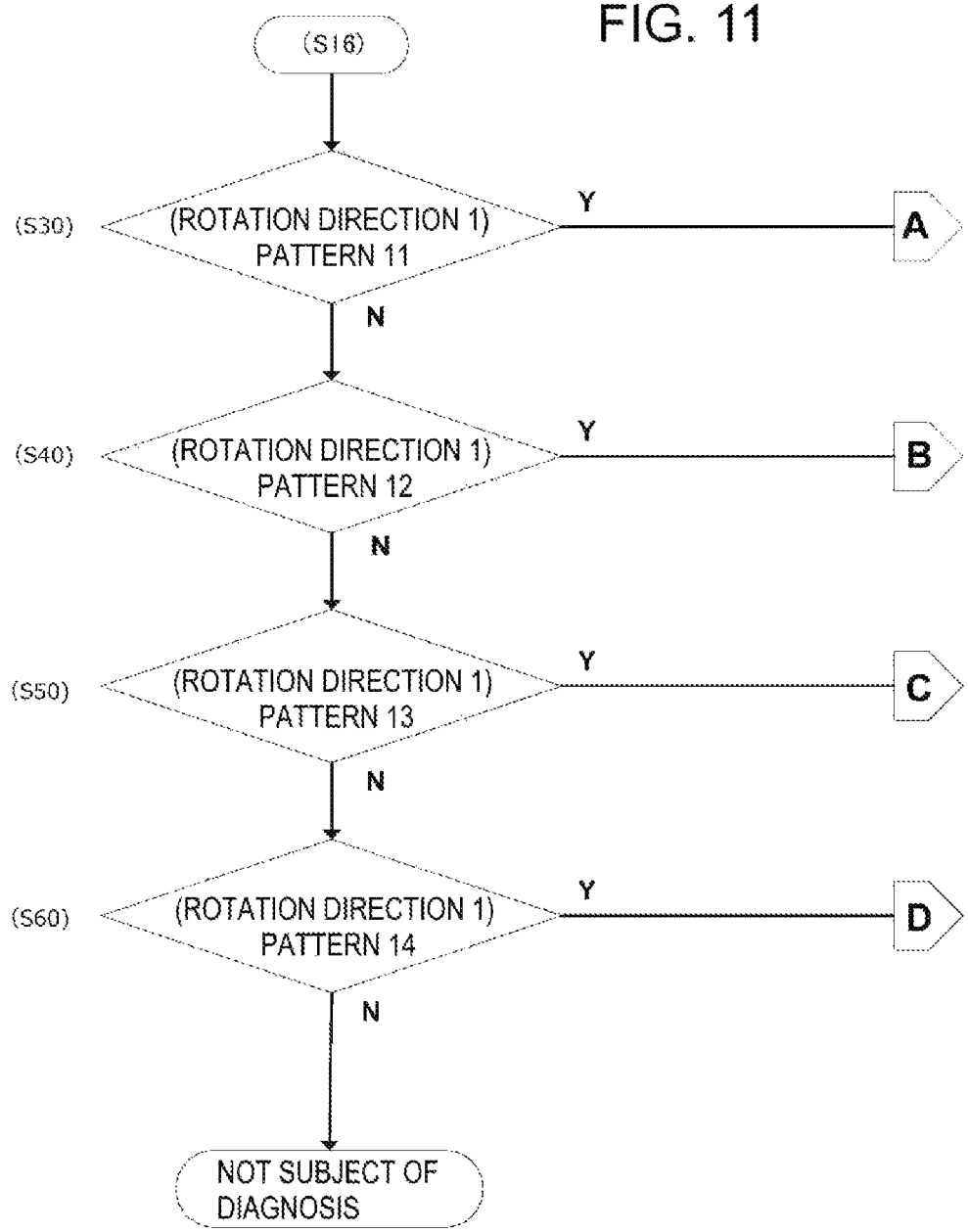
FIG. 11 is a basic flow diagram for abnormal portion identification.

In FIG. 11, one of states of patterns 11 to 14 is determined which corresponds to a first detection pattern in the rotation direction 1 (S30, S40, S50, S60). In the case of pattern 11, there is a possibility of an incidental error without the abnormality, and it is determined that any abnormal portion does not exist. In the case of pattern 12, it is possible to extract a possibility that an abnormal portion is the second detecting member 15 from the detection pattern. In the case of pattern 13, it is possible to extract a possibility that an abnormal portion is the first detecting member 14 or the mechanism section 12 of the punch blade 62, punch cam 64 and the like from the detection pattern. In the case of pattern 14, it is possible to extract a possibility that an abnormal portion is one of the mechanism section 12, motor 60M and control section 11.

Figure 12:
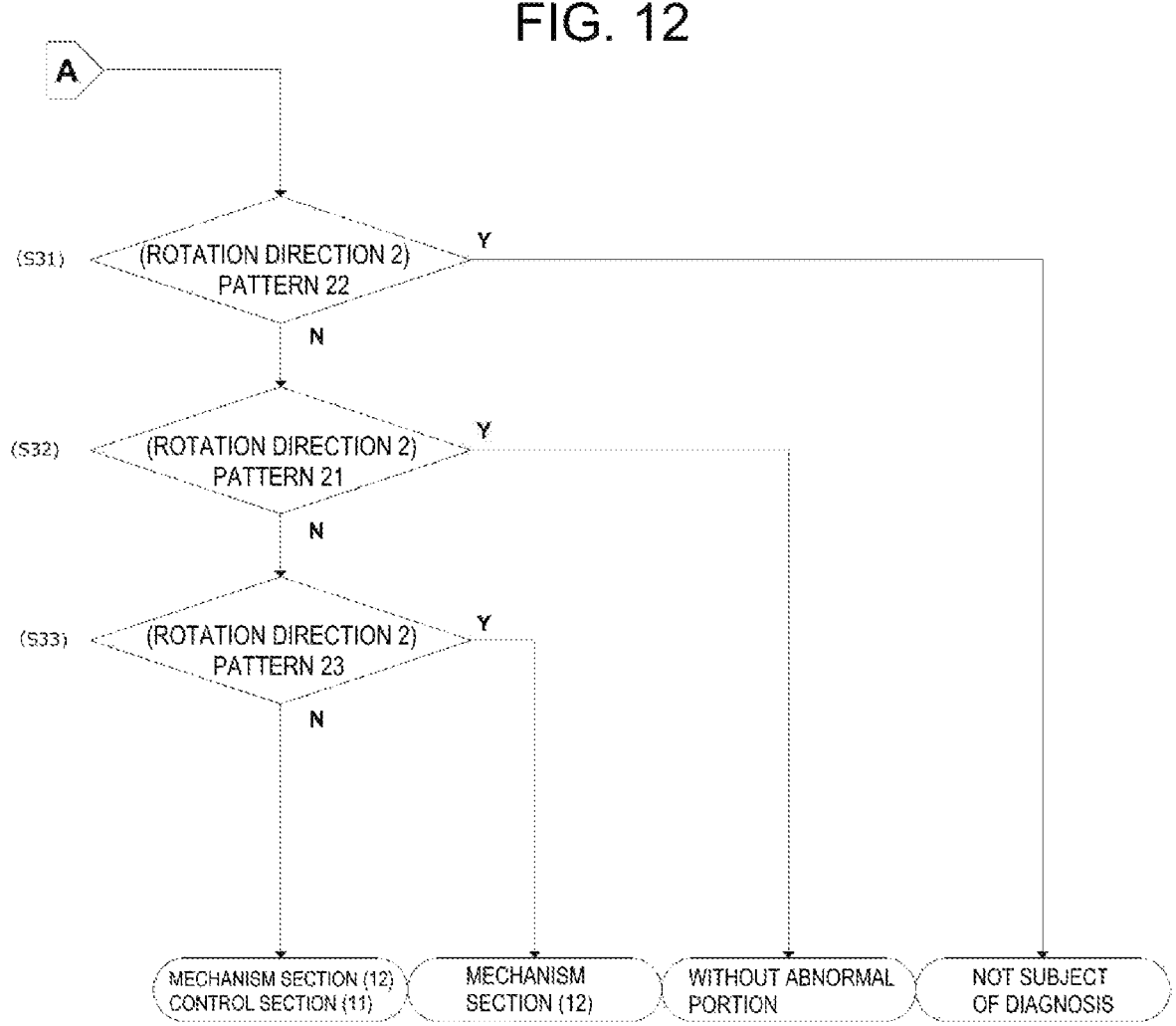
FIG. 12 is a first abnormal portion identification flow diagram.

FIG. 12 is a flow in the case where the first detection pattern in the rotation direction 1 is pattern 11 in the step (S30) of FIG. 11. Herein, it is first determined whether the second detection pattern in the rotation direction 2 is pattern 22 (S31). In the case of the pattern 22, since the sensor state is impossible, it is determined that the case is not a subject of abnormal diagnosis.

Returning to the step (S31), in the case where the pattern is not the pattern 22, it is determined whether the pattern is pattern 21 (S32). In the case of the pattern 21, there is a possibility of an incidental error without the abnormality, and it is determined that any abnormal portion does not exist.

Returning to the step (S32), in the case where the pattern is not the pattern 21, it is determined whether the pattern is pattern 23 (S33). In the case of the pattern 23, it is possible to identify that the mechanism section 12 of the punch blade 62, punch cam 64 and the like is abnormal.

Returning to the step (S33), in the case where the pattern is not the pattern 23, it is possible to identify the mechanism section 12 of the punch blade 62, punch cam 64 and the like or the control section 11.

Figure 13:
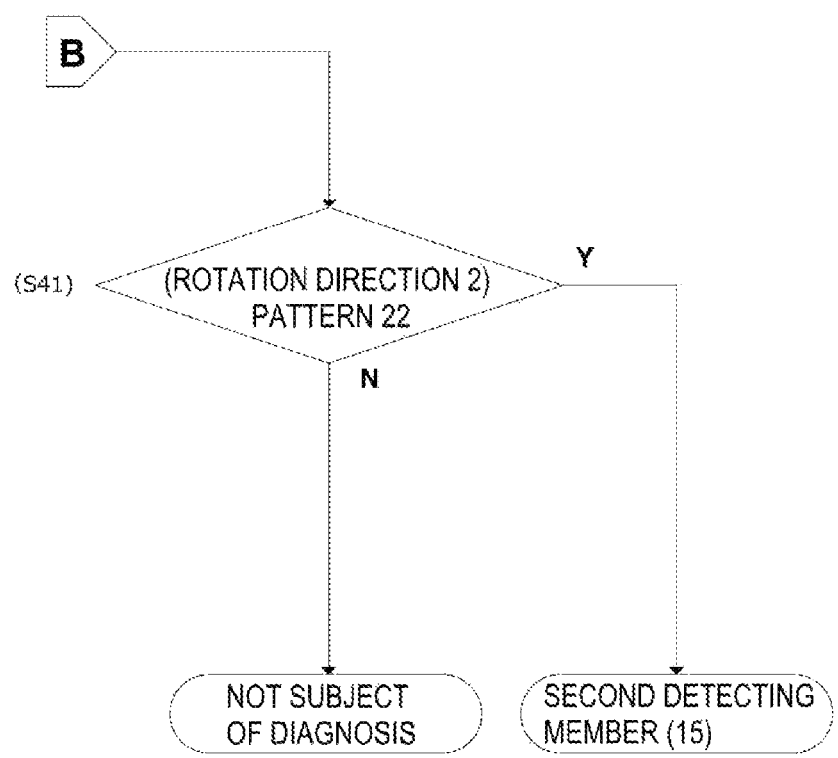
FIG. 13 is a second abnormal portion identification flow diagram.

FIG. 13 is a flow in the case where the first detection pattern in the rotation direction 1 is pattern 12 in the step (S40) of FIG. 11. Herein, it is first determined whether the second detection pattern in the rotation direction 2 is pattern 22 (S41). In the case of the pattern 22, it is possible to identify that an abnormal portion is the second detecting member. On the other hand, in the case where the pattern is not the pattern 22, since the sensor state is impossible, it is determined that the case is not a subject of abnormal diagnosis.

Figure 14:
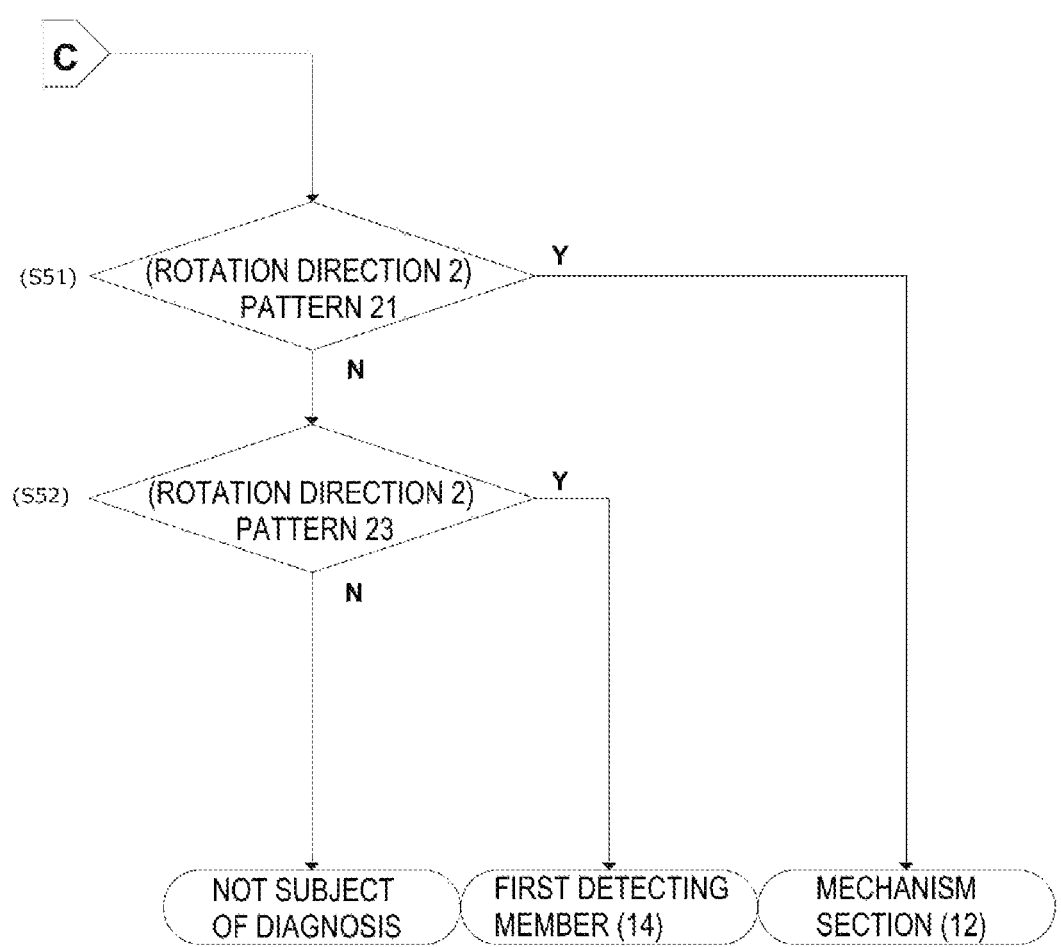
FIG. 14 is a third abnormal portion identification flow diagram.

FIG. 14 is a flow in the case where the first detection pattern in the rotation direction 1 is pattern 13 in the step (S50) of FIG. 11. Herein, it is first determined whether the second detection pattern in the rotation direction 2 is pattern 21 (S51). In the case of the pattern 21, it is possible to identify that an abnormal portion is the mechanism section 12.

Returning to the step (S51), in the case where the pattern is not the pattern 21, it is determined whether the second detection pattern in the rotation direction 2 is pattern 23 (S52). In the case of the pattern 23, it is possible to identify that an abnormal portion is the first detecting member 14. On the other hand, in the case where the pattern is not the pattern 23, since the sensor state is impossible, it is determined that the case is not a subject of abnormal diagnosis.

Figure 15:
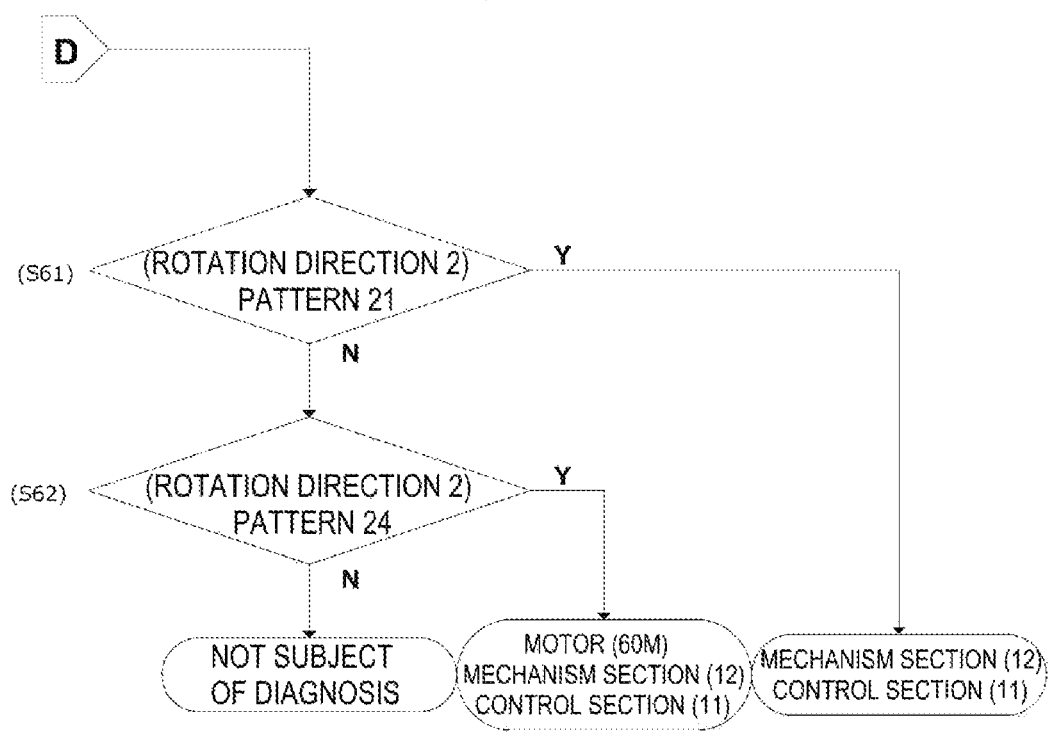
FIG. 15 is a fourth abnormal portion identification flow diagram.

FIG. 15 is a flow in the case where the first detection pattern in the rotation direction 1 is pattern 14 in the step (S60) of FIG. 11. Herein, it is first determined whether the second detection pattern in the rotation direction 2 is pattern 21 (S61). In the case of the pattern 21, it is possible to identify that an abnormal portion is the mechanism section 12 or the control section 11. When the first detection pattern in the rotation direction 1 is pattern 14, it is extracted that the mechanism section 12, motor 60M and control section 11 have possibilities of being an abnormal portion. However, in the case of the H bridge circuit 19, even when one of the transistors is abnormal, it is possible to rotate and drive in one of the directions. Therefore, in the rotation direction 2, when any abnormality does not occur in the first detecting member 14 and the second detecting member 15, detection values are detected from both of the detecting members. By this means, the motor 60M is eliminated from portions with possibilities that the abnormality occurs, and it is identified that the abnormal portion is the mechanism section 12 or the control section 11. Returning to the step (S61), in the case where the pattern is not the pattern 21, it is determined whether the second detection pattern in the rotation direction 2 is pattern 24 (S62). In the case of the pattern 24, it is possible to identify that an abnormal portion is one of the mechanism section 12, motor 60M and control section 11. On the other hand, in the case where the pattern is not the pattern 24, since the sensor state is impossible, it is determined that the case is not a subject of abnormal diagnosis.

As described above, by displaying the determination results (FIGS. 16 and 17) based on first and second detection patterns in the sheet processing apparatus B and a display section 120 (see FIG. 1) provided in the image forming apparatus A provided with the sheet processing apparatus B, it is possible to promptly and properly perform support in the case where the abnormality occurs. Further, by notifying a service center and the like having charge of maintenance of the determination result using the Internet line and/or telephone line, it is possible to inform the maintenance person who performs maintenance of the apparatus of a part where the abnormality occurs, and it is possible to reduce the time required for repairs.

In addition, in this Embodiment, as the configuration driven by the rotation drive control apparatus 10, the punch unit 60 for punching a punch hole in a sheet with an image formed is described as an example. However, the configuration is not limited to such a punch unit 60, and may be a sheet transport unit for transporting a sheet using forward-backward rotation of the motor, and a sheet shift unit for shifting a sheet in the sheet width direction crossing the sheet transport direction. Further, the Embodiment is described using the configuration where the rotation drive control apparatus 10 installed in the punch unit 60 has the control section 11, but the control section 11 may be disposed in the sheet processing apparatus B and image forming apparatus A provided with the sheet processing apparatus B.

The invention claimed is:

1. A rotation drive control apparatus comprising:
a motor;
a control section including a control member for driving and controlling the motor;
a mechanism section including a punch cam that undergoes drive of the motor to rotate; and
a detecting section including a first detecting member that detects a rotation reference position as a reference of rotation of the punch cam, and a second detecting member that detects a rotation shift position of the punch cam,
wherein the control member is provided with a first mode for counting a detection value of the second detecting member to control a shift amount of the punch cam, based on a detection value of the first detecting member obtained in controlling and rotating the motor, and
a second mode for extracting at least one abnormal portion from among the motor, the control section, the mechanism section, and the detecting section, based on detection patterns comprised of combinations of a state in which the first detecting member detects the rotation reference position within a first predetermined time, or a state in which the first detecting member does not detect the rotation reference position within the first predetermined time, and a state in which the second detecting member detects the rotation shift position within a second predetermined time, or a state in which the second detecting member does not detect the rotation shift position within the second predetermined time, obtained in controlling and rotating the motor.

2. The rotation drive control apparatus according to claim 1, wherein the second mode is started when an operation abnormality occurs by the first mode.

3. The rotation drive control apparatus according to claim 1, wherein the control section beforehand stores each of the first detection pattern and the second detection pattern, and based on comparison between combinations of the first detection pattern and the second detection pattern which are beforehand stored, identifies the abnormal portion from among the motor, the control section, the mechanism section, and the detecting section.

4. The rotation drive control apparatus according to claim 1, wherein the second mode is to extract the second detecting member as the abnormal portion, when the first detecting member detects the rotation reference position within the first predetermined time, and the second detecting member does not detect the rotation shift position within the second predetermined time.

5. The rotation drive control apparatus according to claim 1, wherein the second mode is to extract the mechanism section or the first detecting member as the abnormal portion, when the first detecting member does not detect the rotation reference position within the first predetermined time, and the second detecting member detects the rotation shift position within the second predetermined time.

6. The rotation drive control apparatus according to claim 1, wherein the second mode k to extract the motor, the control section or the mechanism section as the abnormal portion, when the first detecting member does not detect the rotation reference position within the first predetermined time, and the second detecting member does not detect the rotation shift position within the second predetermined time.

7. The rotation drive control apparatus according to claim 1, wherein the first detecting member and the second detecting member are provided with first and second photosensors, and detection-object members that rotate together with the punch cam, respectively, and the detection-object members are provided with first slits formed along a rotation direction in which the punch cam rotates to detect the rotation reference position, and second slits formed at intervals finer than an interval of the first slits to detect the rotation shift position of the punch cam.

8. The rotation drive control apparatus according to claim 1, wherein the mechanism section is provided with a punch blade for punching in a sheet.

9. A sheet processing apparatus provided with the rotation drive control apparatus according to claim 1.

10. An image forming apparatus provided with the sheet processing apparatus according to claim 9.

11. A rotation drive control apparatus comprising:
a motor adapted to rotate in one rotation direction and in another rotation direction opposite to the one rotation direction;
a control section including a control member for driving and controlling the motor;
a mechanism section including a punch cam that undergoes drive of the motor to rotate; and
a detecting section including a first detecting member that detects a rotation reference position of the punch cam, and a second detecting member that detects a rotation shift position of the punch cam,
wherein the control member is provided with a first mode for counting a detection value of the second detecting member to control a shift amount of the punch cam, based on a detection value of the first detecting member obtained in controlling and rotating the motor,
a first detection pattern comprised of combinations of a state in which the first detecting member detects the rotation reference position within a first predetermined time, or a state in which the first detecting member does not detect the rotation reference position within the first predetermined time, and
a state in which the second detecting member detects the rotation shift position within a second predetermined time, or a state in which the second detecting member does not detect the rotation shift position within the second predetermined time, obtained in controlling and rotating the motor in the one rotation direction;
a second detection pattern comprised of combinations of a state in which the first detecting member detects the rotation reference position within the first predetermined time, or a state in which the first detecting member does not detect the rotation reference position within the first predetermined time, and
a state in which the second detecting member detects the rotation shift position within the second predetermined time, or a state in which the second detecting member does not detect the rotation shift position within the second predetermined time, obtained in controlling and rotating the motor in the other rotation direction;
and a second mode for identifying at least one abnormal portion from among the motor, the control section, the mechanism section, and the detecting section, based on the first detection pattern and the second detection pattern.

12. The rotation drive control apparatus according to claim 11, wherein the second mode is to identify the mechanism section as the abnormal portion, when the first detecting member detects the rotation reference position within the first predetermined time, while the second detecting member detects the rotation shift position within the second predetermined time in controlling and rotating the motor in the one rotation direction, and in controlling and rotating the motor in the other rotation direction, the first detecting member does not detect the rotation reference position within the first predetermined time, while the second detecting member detects the rotation shift position within the second predetermined time.

13. The rotation drive control apparatus according to claim 11, wherein the second mode is to identify the mechanism section or the control section as the abnormal portion, when the first detecting member detects the rotation reference position within the first predetermined time, while the second detecting member detects the rotation shift position within the predetermined time in controlling and rotating the motor in the one rotation direction, and in controlling and rotating the motor in the other rotation direction, the first detecting member does not detect the rotation reference position within the first predetermined time, while the second detecting member does not detect the rotation shift position within the second predetermined time.

14. The rotation drive control apparatus according to claim 11, wherein the second mode is to identify the second detecting member as the abnormal portion, when the first detecting member detects the rotation reference position within the first predetermined time, while the second detecting member does not detect the rotation shift position within the second predetermined time in controlling and rotating the motor in the one rotation direction, and in controlling and rotating the motor in the other rotation direction, the first detecting member detects the rotation reference position within the first predetermined time, while the second detecting member detects the rotation shift position within the second predetermined time.

15. The rotation drive control apparatus according to claim 11, wherein the second mode is to identify the mechanism section as the abnormal portion, when the first detecting member does not detect the rotation reference position within the first predetermined time, while the second detecting member detects the rotation shift position within the second predetermined time in controlling and rotating the motor in the one rotation direction, and in controlling and rotating the motor in the other rotation direction, the first detecting member detects the rotation reference position within the first predetermined time, while the second detecting member detects the rotation shift position within the second predetermined time.

16. The rotation drive control apparatus according to claim 11, wherein the second mode k to identify the first detecting member as the abnormal portion, when the first detecting member does not detect the rotation reference position within the first predetermined time, while the second detecting member detects the rotation shift position within the second predetermined time in controlling and rotating the motor in the one rotation direction, and in controlling and rotating the motor in the other rotation direction, the first detecting member does not detect the rotation reference position within the first predetermined time, while the second detecting member detects the rotation shift position within the second predetermined time.

17. The rotation drive control apparatus according to claim 11, wherein the second mode is to identify the mechanism section or the control section as the abnormal portion, when the first detecting member does not detect the rotation reference position within the first predetermined time, while the second detecting member does not detect the rotation shift position within the second predetermined time in controlling and rotating the motor in the one rotation direction, and in controlling and rotating the motor in the other rotation direction, the first detecting member detects the rotation reference position within the first predetermined time, while the second detecting member detects the rotation shift position within the second predetermined time.

18. The rotation drive control apparatus according to claim 11, wherein the second mode is to identify the motor, the mechanism section or the control section as the abnormal portion, when the first detecting member does not detect the rotation reference position within the first predetermined time, while the second detecting member does not detect the rotation shift position within the second predetermined time in controlling and rotating the motor in the one rotation direction, and in controlling and rotating the motor in the other rotation direction, the first detecting member does not detect the rotation reference position within the first predetermined time, while the second detecting member does not detect the rotation shift position within the second predetermined time.

* * * * *